United States Patent [19]

Kuronen

[11] Patent Number: 5,038,870

[45] Date of Patent: Aug. 13, 1991

[54] ICE AUGER CUTTER

[76] Inventor: Leo J. Kuronen, Tasapää 82430, Puhos, Finland

[21] Appl. No.: 543,980

[22] Filed: Jun. 26, 1990

[51] Int. Cl.[5] ............................................. F25C 5/04
[52] U.S. Cl. ..................................... 175/18; 175/373; 175/394; 175/404; 408/202
[58] Field of Search ................. 175/18, 323, 394, 404; 299/24, 25; 408/196, 201–203, 210

[56] References Cited

U.S. PATENT DOCUMENTS

| 2,393,282 | 1/1946 | Berlin | 175/18 |
|---|---|---|---|
| 2,476,047 | 7/1949 | Kidder . | |
| 3,051,253 | 8/1962 | McCann | 175/18 |
| 3,131,777 | 5/1964 | Snider | 175/18 |
| 3,175,630 | 3/1965 | Hein et al. . | |
| 3,760,890 | 9/1973 | Rantanen | 175/18 |
| 3,786,876 | 1/1974 | Aaltonen | 175/18 |
| 3,929,196 | 12/1975 | Rantanen | 175/18 |

FOREIGN PATENT DOCUMENTS 43442 4/1971 Finland .
59907 11/1925 Sweden .

Primary Examiner—Bruce M. Kisliuk
Attorney, Agent, or Firm—Renner, Otto, Boisselle & Sklar

[57] ABSTRACT

Ice auger cutters include a shaft having a handle connected to one end for rotating the shaft about its axis, cutting elements secured to an opposite end of the shaft positioned radially outwardly from the axis, and an adjustable stop coaxially positioned between the cutting elements to control the penetration or feed rate of the cutter according to the density and temperature of the ice and strength of the operator.

18 Claims, 1 Drawing Sheet

U.S. Patent        Aug. 13, 1991        5,038,870
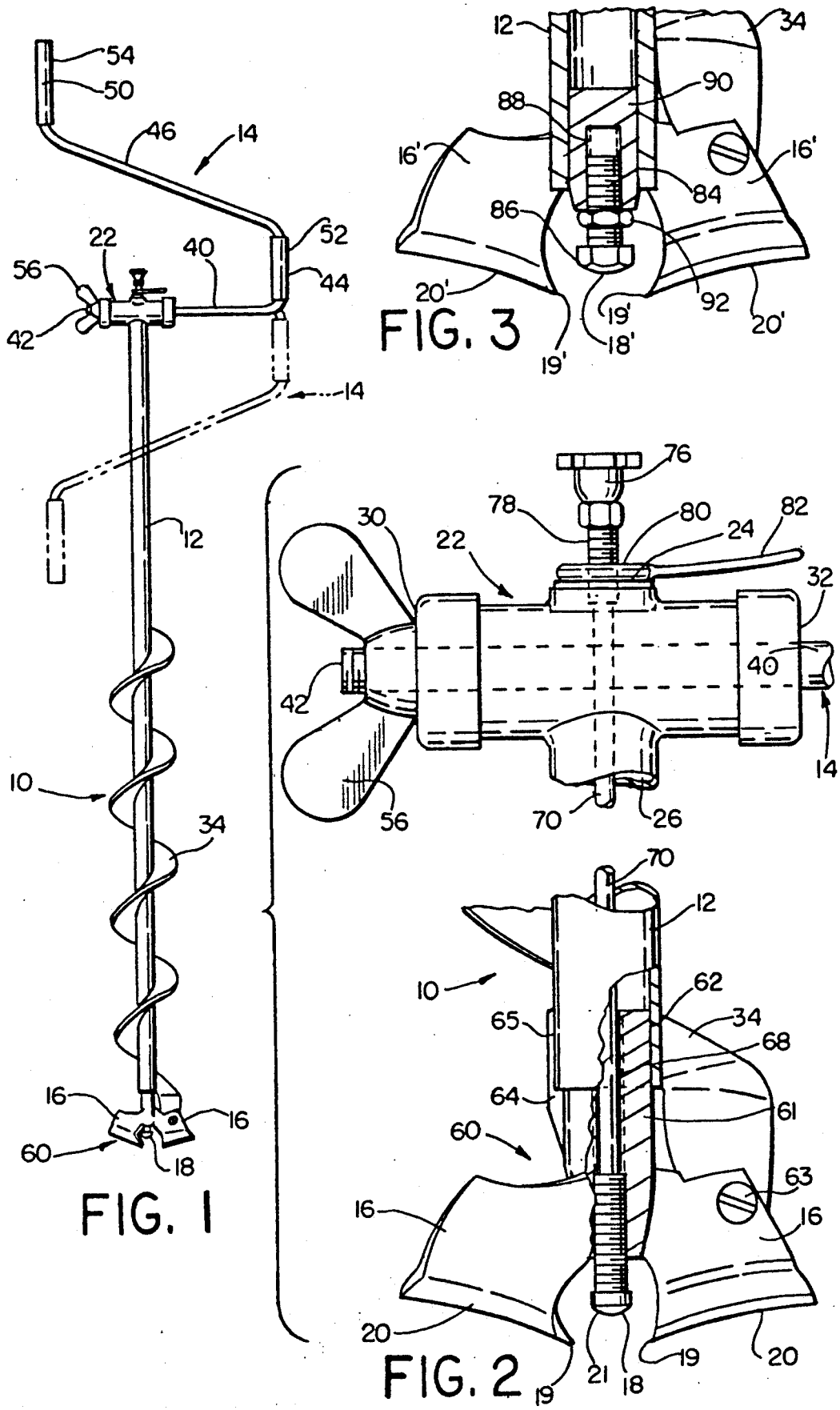

ICE AUGER CUTTER

FIELD OF THE INVENTION

This invention relates to ice auger cutters for drilling and cleaning holes in ice whereby the holes may be used for ice fishing, and more particularly, to ice auger cutters having an adjustable stop for limiting the rate of penetration of the cutting elements into the ice.

BACKGROUND OF THE INVENTION

Ice fishing is very popular in many places in the world. To ice fish, a hole must first be drilled in the ice. Ice augers are commonly used to drill and clean such ice holes. When cutting an ice hole, it is desirable to have an ice cutting auger which will cut in a highly efficient manner regardless of the temperature and condition of the ice being cut.

The ice cutting condition changes with the temperature. The lower the temperature, the easier the ice cuts. When the temperature is low, the ice is dry and brittle, whereby the ice chips move up easier and don't have a tendency to pack on the cutter blades. When the temperature goes up and the ice becomes wet, the chips have a tendency to pack in the hole above the blades, which puts pressure on the blades and causes the cutter to feed too fast, making it too difficult if not impossible to turn. Also, the wet ice tends to freeze to the blades thereby increasing the effective thickness thereof making it more difficult to move the blades through the ice previously cut.

Furthermore, in the screwformed design of a cutter, sharpening is difficult in that the cutter blades must be sharpened so that, when boring, the rate of penetration of the blades does not require more turning torque than the operator can reasonably apply to the cutter, and the cutter blades do not become overly clogged. In general, the strength of the operator will determine the rate at which the cutter should penetrate into the ice.

U.S. Pat. No. 3,131,777, granted May 5, 1964, discloses one type of ice auger that has adjustable shoes which regulate the penetration of the auger into the ice. The shoes comprise a pair of substantially semicircular plates secured around a pointed blade which serves as the cutting element of the ice auger. The shoes run close to the edge of the hole and scrape away ice chips from the edge. Because of their location around the cutting element, the shoes tend to add resistance to turning, making the auger harder to turn.

A need therefore remains for an ice auger cutter which will cut in a highly efficient manner regardless of the density and temperature of the ice being cut and which may be adjusted to change the rate of penetration of the cutter blades to fit the strength of the individual user. Also, there is a need for such an ice auger cutter which may be easily sharpened.

SUMMARY OF THE INVENTION

The present invention provides an ice auger cutter, including a shaft having a handle connected to one end for rotating the shaft around its axis, cutting elements secured to the opposite end positioned radially outwardly from the axis, and a stop positioned coaxially between and spaced axially above the cutting elements for limiting the rate of penetration of the cutting elements into the ice. Preferably, the stop is easily adjustable to provide for easy adjustment of the rate of penetration of the cutting elements into the ice to suit the ice conditions and strength of the operator, and make possible simple and easy sharpening of the cutting elements.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In the annexed drawing:

FIG. 1 is a side elevation view of one form of ice auger cutter according to the present invention;

FIG. 2 is an enlarged partial side elevation view of the ice auger cutter of FIG. 1, with portions broken away to show in detail an adjustable mechanism for adjusting the position of a stop; and FIG. 3 is an enlarged partial longitudinal section view through another form of adjustment mechanism for adjusting the position of a stop of an ice auger cutter in accordance with this invention.

DETAILED DESCRIPTION OF THE INVENTION

Referring now in detail to the drawing and initially to FIG. 1, an ice auger cutter according to the present invention is shown generally at 10. The cutter 10 includes a shaft 12 having a handle 14 connected to one end for rotating the shaft about its axis. Cutting elements or blades 16 are secured to the opposite end of the shaft and are positioned radially outwardly from its axis. An adjustable stop 18 is positioned coaxially between and spaced axially above the cutting edges 20 of the cutting elements 16 for limiting the rate of penetration of the cutting elements into the ice.

As shown in greater detail in FIG. 2, the inner ends 19 of the cutting edges 20 are radially spaced apart so as to leave an upstanding cylinder of ice (not shown) which is engaged by the rounded head 21 of the stop 18 as the drilling progresses. This decreases the feed of the cutter 10 and torque application as the rounded head 21 penetrates and breaks up the cylinder of ice.

The distance that the stop 18 protrudes beyond the end of the shaft 12 is adjusted to control the penetration or feed rate of the cutter 10 according to the density and temperature of the ice. In this manner, the cutter 10 may be easily and quickly adjusted based on ice conditions and/or the operator's strength. In addition, the sharpening of the cutting elements 16 will be much easier in that the undersides of the cutting edges 20 may be sharpened as much as possible, since the stop 18 rather than cutting angles of the cutting edges 20 will determine the rate of penetration of the cutter 10.

Referring particularly to FIG. 2, the shaft 12 is basically a hollow tube with a union 22 connected to its upper end. The union 22 may have a top opening 24, a bottom opening 26 and opposite side openings 30 and 32. The union 22 cooperates with the shaft 12 for adjustment of the handle 14 and stop 18 as explained in more detail below. Spiral flights 34 welded or otherwise secured to shaft 12 serve to lift the cut ice away from the hole during the drilling process.

The handle 14 is desirably pivotally connected to the upper end of the shaft 12 through the union 22 so that the handle can be laid down flat against the shaft 12 as shown in phantom lines in FIG. 1 when not in use for ease of storage and transportation. To that end, handle 14 has a horizontal portion 40 with a threaded end 42; a first vertical portion 44; an angled portion 46; and a second vertical portion 50. The vertical portions 44 and 50 have hand grips 52 and 54 thereon, as these portions are typically grasped by the operator's hands while rotating the cutter 10. The horizontal portion 40 extends through the side openings 30, 32 of the union 22 with its threaded end 42 extending outwardly beyond the adjacent end thereof. A suitable stop (not shown) prevents the horizontal portion 40 from extending further through the union 22. Threaded onto the end 42 is a wing nut 56 that is used to secure the handle 14 at the desired operating angle which is usually with portions 44 and 50 being situated generally vertically above the shaft 12. Wing nut 56 may be loosened and the handle 14 rotated 180° as shown in phantom in FIG. 1 for ease of storage and transportation.

In the embodiment shown in FIGS. 1 and 2, the cutting elements 16 are part of an integral cutter unit 60 including a central hub member 61 from which the cutting elements 16 extend symmetrically and radially. The hub member 61 extends into the bottom open end 62 of the hollow shaft 12 and may either be permanently secured in place as by welding or keyed thereto for ease of removal and replacement. In FIG. 2 the cutter unit 60 is shown removably connected to the bottom of the spiral flights 34 by means of a suitable fastener 63. To drive the removable cutter unit 60, a key 64 is provided on the exterior of the hub member 61 which fits into an axial slot 65 in the bottom of the shaft 12. Alternatively, cutting elements 16' may be integrally attached to the bottom of the shaft 12 as schematically shown in FIG. 3. The cutting edges 20, 20' of the cutting elements 16, 16' may be substantially straight or curved as desired.

The cutter hub member 61 has a threaded coaxial bore 68 extending therethrough for threaded engagement of the adjustable stop 18 which is positioned coaxially between the cutting elements 16 for controlling the rate of penetration of the cutting elements 16 into the ice during rotation of the cutter as previously described.

The stop 18 shown in FIGS. 1 and 2 is integrally connected to an elongated rod 70 extending through the center of the shaft 12 and out through the upper end thereof. Rod 70 is laterally offset with respect to the horizontal portion 40 of handle 14 to avoid interference therebetween. The stop 18 may be adjusted up or down (axially in or out) by turning a knob 76 threaded onto the upper threaded end 78 of the rod 70 upon releasing a lock nut 80 which is also threaded onto the rod 70 and may have a lever arm 82 extending therefrom for ease of turning the lock nut 80.

Alternatively, the stop 18' may comprise a bolt 84 having a hexagonal head 86 partially threaded into a blind hole 88 in a plug 90 welded or otherwise suitably secured within the bottom end of the hollow shaft 12. A nut 92 locks the bolt 84 in place so its head 86 will stay in the desired adjusted position with respect to the cutting elements 16'.

From the foregoing, it will now be apparent that the ice auger cutters of the present invention may be used to cut through ice in a highly efficient manner regardless of the density and temperature of the ice by adjusting the distance that the stop protrudes beyond the end of the cutter shaft to control the penetration or feed rate of the cutter according to the ice density and temperature and the strength of the operator. Further, the location of the stop coaxially between the cutting elements does not significantly add torque resistance, and the sharpening of the cutting elements is made easier.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. An ice auger cutter comprising a shaft having handle means connected to one end for rotating said shaft about an axis, cutter means secured to an opposite end of said shaft having plural cutting edges positioned radially outwardly from said axis, and stop means positioned coaxially between and spaced axially above said cutting edges for limiting the rate of penetration of said cutter means into said ice during rotation of said cutter.

2. An ice auger cutter as set forth in claim 1 further comprising adjustment means for adjusting said stop means longitudinally relative to said cutter means.

3. An ice auger cutter as set forth in claim 2 wherein said stop means includes a screwformed bolt having a rounded head extending axially outwardly from said opposite end of said shaft.

4. An ice auger cutter as set forth in claim 3 further comprising a cutter unit having a central hub portion, said cutter means being mounted on said hub portion.

5. An ice auger cutter as set forth in claim 4 wherein said shaft is hollow and said central hub portion fits inside said shaft and is secured thereto.

6. An ice auger cutter as set forth in claim 5 wherein said cutter unit is removably connected to said shaft.

7. An ice auger cutter as set forth in claim 6 wherein said cutter unit is keyed to said opposite end of said shaft for driving rotation by said shaft.

8. An ice auger cutter as set forth in claim 7 further comprising fastener means removably connecting said cutter unit to said shaft.

9. An ice auger cutter as set forth in claim 8 further comprising spiral flight means attached to said shaft, said cutter unit being removably connected to said spiral flight means by said fastener means.

10. An ice auger cutter as set forth in claim 4 wherein said cutter unit is permanently affixed to said opposite end of said shaft.

11. An ice auger cutter as set forth in claim 1 wherein said cutting edges are permanently affixed to said opposite end of said shaft.

12. An ice auger cutter as set forth in claim 1 wherein said cutting edges are spaced symmetrically about said shaft, said cutting edges having radially inner ends spaced apart so as to leave an upstanding cylinder of ice which is engaged by said stop means during drilling into the ice to decrease the feed of said cutter and torque application as said stop means penetrates and breaks up the cylinder of ice.

13. An ice auger cutter as set forth in claim 12 further comprising a hub member at said opposite end of said shaft having a threaded bore in which said stop means is threaded.

14. An ice auger cutter as set forth in claim 2 wherein said adjustment means includes an adjustment rod integral with said stop means, said adjustment rod extending out through said one end of said shaft, and knob means on a protruding end of said rod to facilitate turning of said rod to thereby adjust said stop means.

15. An ice auger cutter as set forth in claim 14 further comprising lock means for releasably locking said rod against rotation.

16. An ice auger cutter as set forth in claim 3 wherein said bolt is partially threaded into said opposite end of said shaft, said adjustment means including a lock nut for locking said bolt in place with its head positioned at a desired height with respect to said cutter means.

17. An ice auger cutter as set forth in claim 1 further comprising spiral flight means secured around said shaft for lifting cut ice away from a hole during drilling.

18. An ice auger cutter as set forth in claim 1 wherein said handle means includes a horizontal portion, a first vertical portion connected to said horizontal portion, an angled portion connected to said first vertical portion, and a second vertical portion connected to said angled portion, and means mounting said handle means for rotation between a raised position in which said vertical portions and angled portions extend above said shaft for ease of turning of said handle means and a lowered position in which said vertical portions and angled portions are substantially flat against said shaft for ease of storage and transportation.

* * * * *